United States Patent [19]

Zilisch

[11] 4,446,850
[45] May 8, 1984

[54] SOLAR PANEL WITH STORAGE

[76] Inventor: Kenneth P. Zilisch, 606 Cape Cod Ave., Appleton, Wis. 54911

[21] Appl. No.: 419,323

[22] Filed: Sep. 17, 1982

[51] Int. Cl.³ .............................................. F24J 3/02
[52] U.S. Cl. .................................. 126/431; 126/419; 126/429; 126/430; 52/1; 52/171; 47/17
[58] Field of Search ............... 126/430, 431, 419, 422; 52/1, 171, 173 R, 741; 47/17

[56] References Cited

U.S. PATENT DOCUMENTS

| | | | |
|---|---|---|---|
| 2,484,127 | 10/1949 | Stelzer | 126/430 X |
| 2,595,905 | 5/1952 | Telkes | 126/419 |
| 3,903,665 | 9/1975 | Harrison | 126/430 |
| 4,062,347 | 12/1977 | Jensen | 126/430 |
| 4,083,356 | 4/1978 | Hapgood | 126/419 |
| 4,111,189 | 9/1978 | Dizon | 126/436 X |
| 4,241,724 | 12/1980 | Hull | 126/436 X |
| 4,306,387 | 12/1981 | Hopkins et al. | 126/419 X |
| 4,355,682 | 10/1982 | Maloney | 126/430 X |

Primary Examiner—Larry Jones
Attorney, Agent, or Firm—Russell L. Johnson

[57] ABSTRACT

A self contained, fully automatic, vertical wall panel, solar energy system characterized by having no moving parts in the panel. The panel is substantially a shallow rectangular box having a closed perimeter, an outer insulating chamber which is substantially a double glazed window, and an inner energy storage chamber which is provided with containers of phase change materials. The energy storage chamber is provided with air entrance and exit passages which communicate with the space to be heated. Thermostatically controlled blowers serve to move air from the space to be heated across the containers of phase change material and back to the space to be heated. Thermostatically controlled blowers also serve to move insulating material into and out of the insulating chamber at appropriate times.

3 Claims, 2 Drawing Figures

SOLAR PANEL WITH STORAGE

FIELD OF THE INVENTION

This invention relates to space heating and/or cooling panels using solar radiation as a source of heat energy.

Particularly, this invention relates to vertical wall panels of the type described above which have as a part of their assembly energy storage capacity in the form of containers of phase change material.

Still more particularly, this invention relates to panels as described above which have no moving parts in the panel and which may be constructed so as to be substantially self-contained with regard to the means for the performing of the regulating of the receiving, storing, and discharge of heat energy.

BACKGROUND OF THE INVENTION

The term "phase change material" as used herein shall be read to mean; "a substance which has the property of remaining at substantially a constant temperature while receiving or giving up significant amounts of heat energy at a temperature at which the material undergoes a change of state". For example; water changes state between liquid and solid at 32 degrees Fahrenheit (0 degrees Celsius). Water will remain at 32 degrees Fahrenheit until the change of state is complete and approximately 144 BTU/pound of water is absorbed or yielded up during the change of state.

The term "thermostat" used herein shall be read to mean "a control means which responds to temperature to initiate, maintain or change the operating mode of a device".

Panels which collect solar energy are well known in the art. State of the art panels often suffer from a number of deficiencies.

One such deficiency of many such panels is the need to provide large often expensive heat storage means and often elaborate and less than satisfactory mechanisms for transferring heat from the panel to storage and from the storage means to the space to be heated.

Another deficiency of state of the art panels is the need for reliable and efficient temperature control both for the panel and for the space to be heated.

Yet another deficiency of many such panels is that of installation and maintenance cost and convenience. Experience has shown that such panels are subjected to a range of mechanical damage from abnormal weather and environmental conditions and activities in the vicinity of the panels. Therefore, provision must be made for the maintenance and repair of even the most well constructed and durable of so called maintenance free panels.

Yet another deficiency of many such panels is that of efficiency. Undesirable heat losses and/or gains often diminish the efficiency of such panels to the point they are not cost effective.

OBJECTS

It is therefore an object of this invention to provide a self-contained, fully automatic, maintenance free, vertical wall solar panel which is highly reliable and efficient.

It is further an object of this invention to provide a solar panel as described above wherein containers of phase change materials are provided as a part of the panel and which serve as a heat storage means and the panel has no moving parts therein.

It is further an object of this invention to provide the panel as described above wherein insulating materials may be provided to and removed from the panel to efficiently limit heat loss and/or gain as required.

It is further an object of this invention to provide a panel as described above wherein the elements of the panel may be economically and conveniently removed, repaired, maintained and/or replaced in the event the panel should sustain externally originating damage such as that brought about by accident, projectiles, or damage to the supporting structure such as fire or explosion or severe weather damage.

It is further an object of this invention to provide panels as described above wherein the panels are of modular construction such that a number of such panels may be employed in an array and the panels may share temperature regulating means and insulation storage and transfer means so as to further enhance the economy, utility and versatility of the panel.

Other objects will become apparent from the specifications, drawings and the appended claims.

DISCUSSION OF THE PRIOR ART

In the last ten years the solar heating art has grown dramatically. The functions of intercepting solar rays, converting these rays to heat energy, and employing this heat energy to heat spaces is common to virtually all prior art solar heating systems. The functions of heat storage and insulation against heat loss and/or gain as required are found in a large percentage of prior art solar heating systems. Vertical wall elements which are solar collectors are not uncommon in the art.

Self contained vertical wall panel solar heating systems are less common in the art. The term "self contained vertical wall panel solar heating systems" as used herein shall be read to mean "a wall panel which has an outer surface exposed to solar radiation and the panel has as a part of its structure a means for receiving and storing solar energy, a means for dispensing heat to a space to be heated, and a means for insulating the system against heat loss and/or gain as required".

Still less common are self contained vertical wall panel solar heating systems which are fully automatic. The term "fully automatic" as used herein shall be read to mean "requiring no user intervention during normal operation".

The patent art contains many solar heating systems which teach one or more of the elements of this invention. Those panels which can be characterized as teaching self contained fully automatic vertical wall panels are; U.S. Pat. No. 4,212,292 which teaches such a panel wherein a phase change material is used for heat storage but relies upon a novel heat absorber to collect heat energy and to, in part, restrict heat loss.

U.S. Pat. No. 4,069,809 teaches the use of a specially constructed building block. This patent can be read as a self contained wall panel (block). It further shares with the instant invention the property of having no moving parts as a part of the panel itself.

The devices of the above described patents are seen as the most relevant of the prior art patents known to the inventor. The instant invention performs many of the same functions performed by the devices taught by these patents but this invention employs distinctly different means to perform these functions and these means interact with each other to perform their functions differently than do the prior art devices.

The non patent prior art contains art of the inventor's knowledge which is relevant and needs be considered when assessing the novelty of this invention. The Rodwall panel provided by Sunwood Energy Products Inc. of Harrisburg, Va., bears a close physical resemblance to the panel of this invention. The Rodwall panel employs rotating phase change rods for heat storage and rotating reflectors to provide a degree of insulation. In counter distinction the panel of this invention has no moving parts in the panel as such and employs insulating beads to provide a high degree of insulation.

The Beadwall (TM) insulating window panel provided by the ZOMEWORKS Company of Albuquerque N.M. is somewhat analogous to the insulating chamber of this invention. The Beadwall (TM) construction teaches a window chamber comprising two parallel glass panels and the chamber may be filled with plastic beads to give the window high insulating properties. The instant invention employs many of the beneficial properties of the Beadwall (TM) window and the instant inventor makes no claim to their invention or discovery.

The prior art does not provide or teach the combination of elements functioning as they function in this invention. Without the hindsight benefits of this disclosure it is not reasonable to see this invention as an obvious combination of the teachings of several of the prior art references. Given the vast body of prior art inventions and the near infinite possibilities of combinations of their elements, and the number of references which would have to be combined to provide the elements of this invention, it is highly improbable that one skilled in the art would find it obvious to select from the art the combination of the elements of this invention.

The inventor knows of no prior art, self contained, fully automatic vertical wall panel solar heating systems wherein the individual functional components may be readily removed, repaired, and/or replaced quickly and conveniently by the user.

At a higher level of invention, the inventor knows of no prior art solar heating system which incorporates the complex interactions of sophisticated functions of this invention in so simple and basic a mode as to be easily understood and readily and effectively used by those of very little skill in the art.

Further, the inventor knows of no prior art self contained fully automatic vertical wall panel solar heating system which employs a solar sampler to optimize the solar energy input and to minimize the heat energy losses of the panel.

BRIEF DESCRIPTION OF THE INVENTION

The invention in its simplest form is a vertical wall panel which may be incorporated in the structure of a vertical wall in much the same manner as a conventional window. The panel is in the shape of a shallow rectangular box having a closed perimeter, broad exterior side which is exposed to solar radiation and a broad interior side which may be adjacent to or a part of the wall of a space to be heated. The panel is divided into two substantially coextensive chambers; an exterior insulating chamber which is substantially a double glazed window and an interior heat storage chamber. The interior pane of the insulating chamber serves as a divider between the insulating chamber and the heat storage chamber. The heat storage chamber has arranged therein an array of containers of phase change material which serve as heat storage elements. The interior wall of the panel has air passages therein through which air from the space to be heated may enter the heat storage chamber, pass over the heat storage elements and then be returned to the space to be heated.

The panel may be provided with thermostatically controlled blowers to pass air through the heating chamber and thereby provide heat on demand for the space to be heated in much the same manner as a conventional hot air heating system.

The insulating chamber may be provided with ports through which insulating material such as polystyrene beads may be introduced into and removed from the insulating chamber. The panel may be provided with a solar sampling chamber having a thermostatic sensor which may interact with a thermostatic sensor in the heat storage chamber to activate an insulating materials blower or vacuum means to move insulating material to and from an insulating materials bin and to and from the insulating chamber as required for efficient collection and storage of energy in the heat storage chamber. The heat storage chamber may be provided with an overheat thermostatic control which serves to exhaust heat from the heat storage chamber if it should reach the overheat temperature.

DETAILED DESCRIPTION OF DRAWINGS

In the figures, like numbers refer to like objects.

Figure 1:
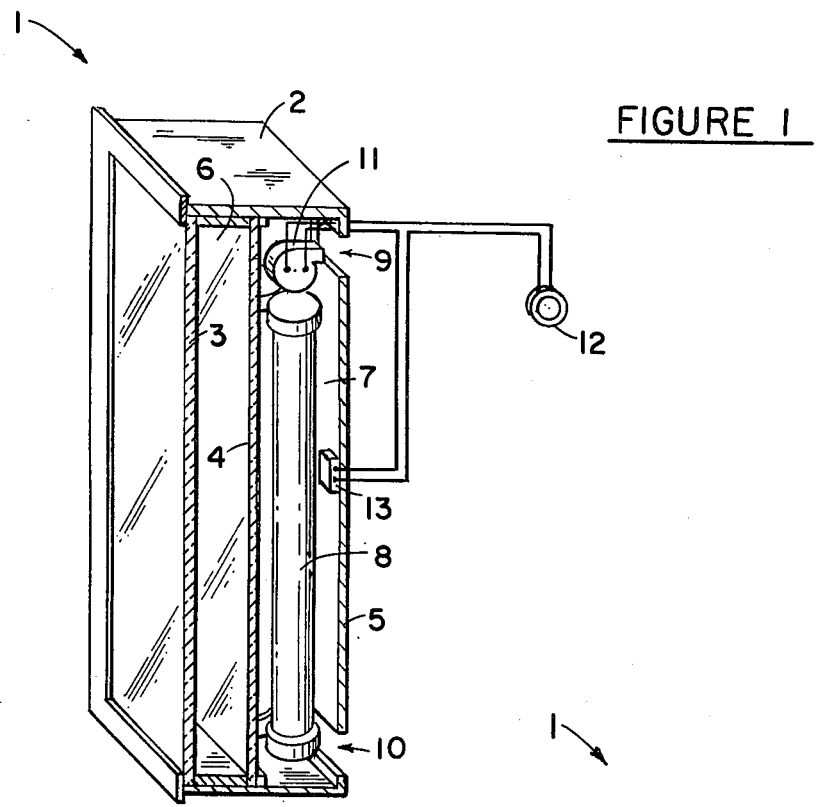
FIG. 1 is a partially schematic sectioned pictorial view of the panel of this invention in its simplest form.

Referring now to FIG. 1. Panel 1 is in the shape of a shallow rectangular box having a substantially continuous frame 2, first transparent pane 3, second transparent pane 4 and opaque back panel 5. The space between panes 3 and 4 serve as an insulating chamber 6 through which solar radiation may pass but heat energy from heat storage chamber 7 is inhibited from flowing through chamber 6. Heat storage chamber 7 has contained therein an array of containers of phase change materials such as heat storage rods 8. Heat storage rods 8 may be heat storage rods provided by Dow Chemical Co. and containing calcium Chloride hexahydrate. This material undergoes phase change at approximately 80 degrees Fahrenheit and is therefore capable of giving up and/or receiving large quantities of heat energy while remaining at that temperature. Back panel 5 is provided with air passageways 9 and 10. Heat storage chamber 7 may be provided with an air mover such as blower 11. Thermostat 12 may serve to actuate blower 11 when the temperature of the space to be heated reaches a preset lower temperature and also serve to turn off blower 11 when the temperature in the space to be heated reaches a preset upper temperature. Thermostatic sensor 13 may serve to deactivate thermostat 12 when the temperature in the heat storage chamber falls below a preset lower temperature. Wall panel 1 of FIG. 1 may have thermostat 12, and blower 11 incorporated in the structure of panel 1. Alternatively these functions may be provided separate from or apart from panel 1 to accommodate a multiplicity of panels similar to panel 1 arranged in a modular array. The direction of flow through heat storage chamber 7 may be reversed by changing the positioning of blower 11 thereby further enhancing the versatility of panel 1.

The panel of FIG. 1 represents the invention in its simplest form and would serve to heat and/or cool spaces such as garages, storage buildings and the like where costs may be of greater concern than more precise temperature control and efficiency.

Double glazed insulating chambers such as chamber 6 of FIG. 1 ordinarily have an insulating value between R3 and R6. It has been found that by filling insulating chamber 6 with insulating material such as polystyrene beads, the insulating value of chamber 6 can be increased to above R10. By doing so at the appropriate times two major deficiencies in prior art solar wall panels are eliminated. The first is that of heat losses through the double glazed insulating chamber due to the relatively low R-value of the chamber. The second is that of overheating of the panel when solar energy is available and the heat storage is full.

Figure 2:
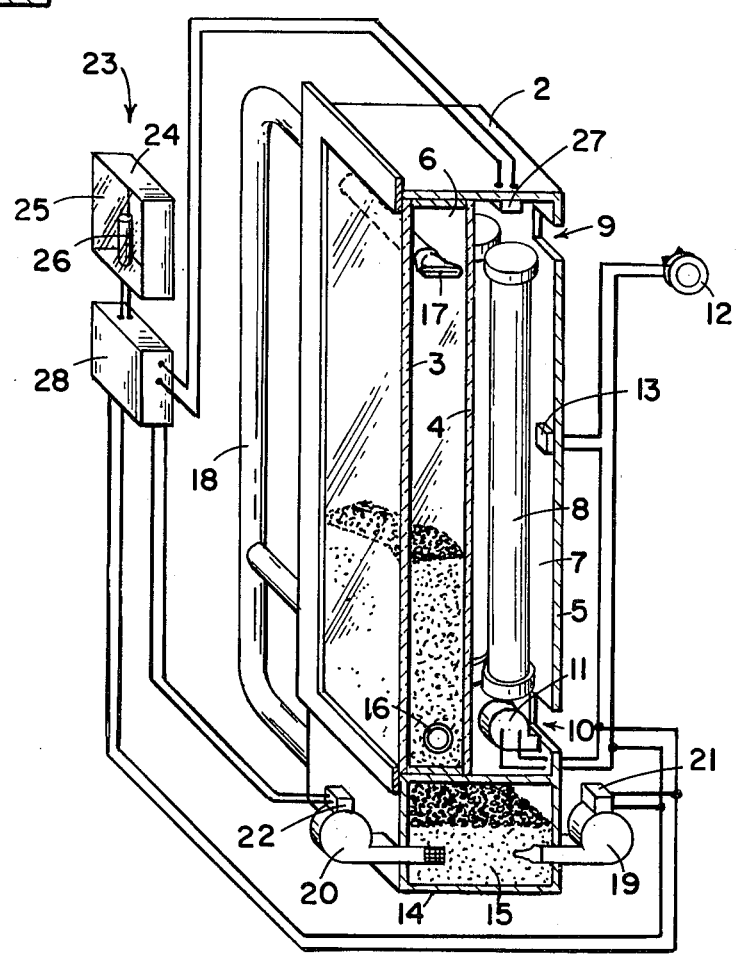
FIG. 2 is a partially schematic sectioned pictorial view of the panel of FIG. 1 with means for providing insulation and temperature control to the panel.

Referring now to FIG. 2. The wall panel of FIG. 1 is provided with storage bin 14 for insulating particles 15 which may be polystyrene beads or the like. Insulating chamber 6 is provided with bead exhaust tube 16 and bead input tube 17 which communicate with bin 14 by way of connecting tube 18. Bin 14 is provided with blower means 19 and vacuum means 20 which are provided with time delay switches 21 and 22 respectively which serve to permit blower means 19 or vacuum means 20 to be actuated for a time period sufficient to fill or empty insulating chamber 6 with insulating particles 15 and to automatically shut off thereafter. Panel 1 is further provided with solar sampler 23 which is substantially a small shallow box 24 having a glazed face 25 and a temperature sensor 26 contained therein. Heat storage chamber 7 is provided with over temperature sensor 27.

In operation insulating chamber 6 is filled with insulating particles 15 when solar energy is not available as determined by solar sampler 23 or when heat storage chamber 7 is at a preset maximum temperature as determined by over temperature sensor 27. When solar energy is available and heat storage chamber 7 is not at maximum temperature thermostatic controller 28 activates time delay switch 22 which causes vacuum means 20 to withdraw insulating particles 15 from insulating chamber 6 and thereby permits solar radiation to pass through insulating chamber 6 and to warm heat storage rods 8 in heat storage chamber 7.

When solar energy becomes unavailable or heat storage chamber 7 is at maximum temperature, thermostatic controller 28 activates delay switch 21 which causes blower means 19 to act to fill insulating chamber 6 with insulating particles 15 and thereby substantially prevent the flow of energy into or out of heat storage chamber 7 by way of insulating chamber 6.

It has been found that when insulating chamber 6 is being filled because of an over temperature in heat storage chamber 7 it is desirable to operate blower 11 for a period of time to prevent a temperature overrun which may result in thermal degradation of the insulating particles 15 in insulating chamber 6 and adjacent to heat storage chamber 7.

The components of the panel of FIG. 2 are shown as separated and spaced apart from each other for the sake of illustration and communication. It can readily be appreciated that these elements can easily be incorporated into the rectangular housing of panel 1 to provide a self contained fully automatic solar wall panel. It will also be obvious to one skilled in the art when employing a number of such panels that a single storage bin, solar sampler, thermostatic controller and the like can be employed to serve more than one panel. It would also be obvious to one skilled in the art to provide the panel of this invention with the customary electrical current overload protection, transformers, indicator lights, manual override switches and the like which are ordinarily incorporated in heating and cooling systems and not shown here.

It should also be obvious to one skilled in the art that there are many variations of the preferred embodiments of the invention disclosed above which would permit versatility of design of the installation of these panels without departing from the scope of this invention.

It should therefore be understood that the scope of this invention should not be limited to the embodiments disclosed herein but should only be limited by the scope of the appended claims and all equivalents thereto which would become apparent to one skilled in the art.

I claim:

1. A self contained fully automatic vertical wall panel solar heating system comprising;
   (a) at least one wall panel in the shape of an enclosed rectangular box having a broad exterior side and a broad interior side and a substantially enclosed perimeter and the panel has no moving parts, and
   (b) the exterior side comprises a first pane of transparent material such as glass and the like and a second pane of transparent material which is substantially coextensive with the first pane of transparent material and spaced apart from the first pane of transparent material so as to form an insulating chamber on the exterior side of the panel,
   (c) a back panel which is opaque and substantially coextensive with the panes of transparent materials and spaced apart from the second pane of transparent materials to form a heat chamber,
   (d) an array of heat storage elements such as containers of phase change materials such as calcium chloride hexahydrate, eutectic salts and the like positioned in the heat chamber, and
   (e) an air entrance passage and an air exit passage passing through the back panel and communicating with the heat chamber so as to permit air from the space to be heated to enter the heat chamber, pass over the array of heat storage elements and be heated thereby, and then to pass through the exit passage into the space to be heated, and
   (f) wherein the heat chamber is provided with a temperature activated heat chamber switch and the space to be heated is provided with a temperature actuated room temperature switch, and the heat chamber is provided with an air moving means such as a fan, blower, and the like and the air moving means is interconnected with the heat chamber switch and the room switch so that the air moving means will be actuated when the heat chamber temperature is above a preset temperature and the room temperature is below a preset lower temperature and operation of the air moving means will continue until the temperature in the vicinity of the room temperature switch reaches a preset upper temperature at which time the room temperature switch will act to deactivate the air moving means and the air moving means serves to draw air from the area to be heated into the heat chamber and over the array of heat storage elements and to blow the air heated thereby into the space to be heated, and (g) wherein the exterior insulating chamber is provided with an insulating particle input port and an insulating particle output port and the insulating partical input port and the insulating particle output port are operably joined to a storage bin filled with insulating particles such as polystyrene beads and the like and the storage bin is provided with a blower means for transferring the insulating particles from the bin to the exterior insulating chamber and a vacuum means for drawing beads from the exterior insulating chamber to the storage bin and the panel is further provided with a solar sampling chamber and the sampling chamber has contained therein a temperature sensing means which serves to actuate a control switch which activates the vacuum means of the bead chamber when the temperature in the sampling chamber reaches a preset upper temperature and thereby serves to remove insulating beads from the insulating chamber and thereby permits solar energy to pass through the insulating chamber into the heat storage chamber and impinge upon the heat storage elements therein and the temperature sensing means in the sampling chamber further serves to actuate a control switch which serves to activate the blower means in the storage bin when the temperature in the sampling chamber reaches a preset lower temperature and thereby acts to fill the insulating chamber with insulating beads and thereby serves to prevent the loss of heat from the heat storage chamber by way of the insulating chamber.

2. The solar heating system of claim 1 wherein the heating chamber is provided with heat storage chamber temperature sensing means which serves to actuate an over temperature control switch which serves to electrically override the solar sampling switch and to activate the blower of the storage bin and thereby fill the exterior insulating chamber with insulating material and thereby prevent the heat chamber from receiving solar energy at times when the heat storage chamber has reached a preset upper temperature and the over temperature sensing means further serves to actuate the over temperature switch so as to reactivate the solar sampling switch and thereby return control of the insulating chamber to the solar sampling means when a preset lower overheat temperature is reached in the heat storage chamber.

3. The solar heating system of claim 2 wherein the over temperature sensor also serves to actuate the air moving means of the heat chamber for a sufficient period of time to prevent thermal overrun from raising the temperature of the heat storage chamber above the over temperature setting of the overtemperature control switch.

* * * * *